Nov. 14, 1950    R. H. SCHEMPP ET AL    2,529,577

SWATH TURNER

Filed June 3, 1948

INVENTORS
ROBERT HAROLD SCHEMPP AND
EDWARD HANS SCHEMPP

By *L. S. Mitchell*

ATTORNEY

Patented Nov. 14, 1950

2,529,577

UNITED STATES PATENT OFFICE 2,529,577

SWATH TURNER

Robert Harold Schempp and Edward Hans Schempp, Maidstone, Saskatchewan, Canada

Application June 3, 1948, Serial No. 30,765

2 Claims. (Cl. 56—370)

1

Our invention relates to swath turners for grain, having reference to a device by which grain in the swath may be turned on the ground to aid in drying.

In the art to which the invention relates, where grain has been cut and left in the swath it is very difficult to turn the swath, as sometimes may be required for drying grain that has become wet, without severe shelling. The present invention contemplates a swath turning machine that may be horse or tractor drawn, and that is adapted to pick up and reverse a swath on the ground without damage by excessive shelling, as more usually occurs in grain swath turning.

One of the objects of the invention is accordingly to provide an improved swath turner by which cut grain lying on the ground in a swath may be picked up and reversed, and then laid on fresh stubble.

A further object of the invention is to provide in the swath turner means for driving the pickup and conveying mechanism that may use the traction wheels of the device as a source of power.

Other features and advantages of the invention will become apparent by reference to the accompanying description taken in conjunction with the drawings, wherein like characters of reference indicate like parts throughout the several views and wherein.

Figure 1:
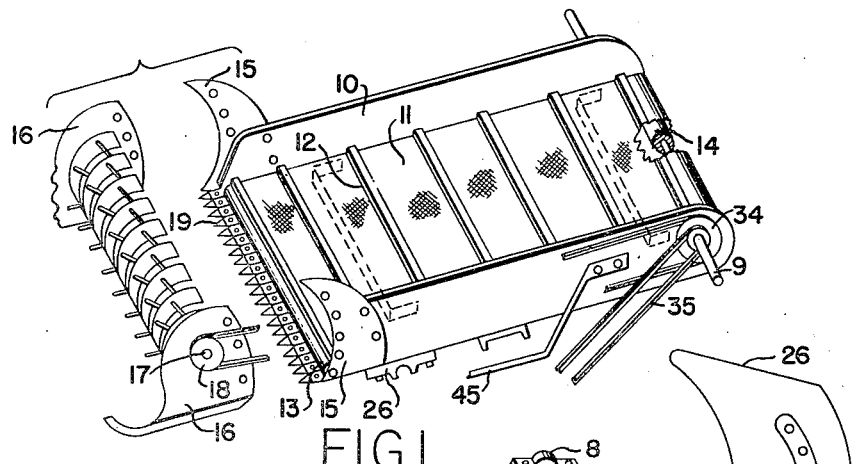
Fig. 1 is a perspective view of a conveyer for the swath turner taken by itself and shown in relation to the pickup.
Figure 2:
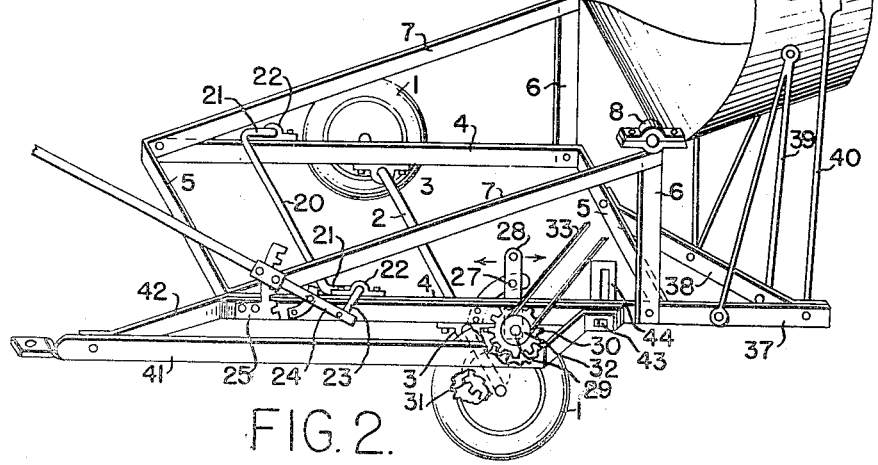
Fig. 2 is a perspective view of the body of the machine, with the conveyer and pickup omitted.
Figure 3:
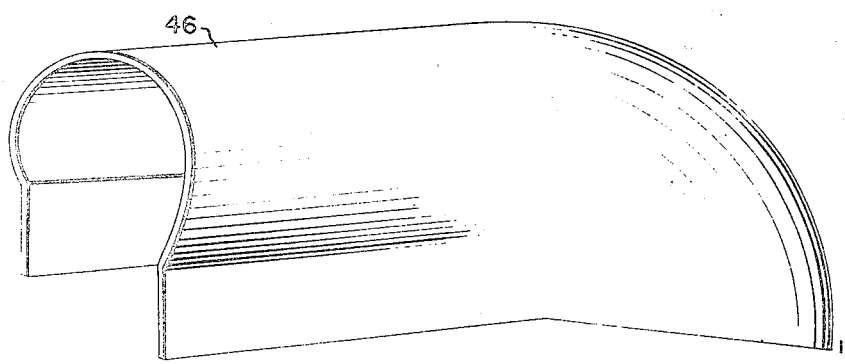
Fig. 3 is a perspective of a wind protection hood for the machine.

Having reference to the drawings, in Figure 2 is shown the frame and traction elements for the machine and including the swath turning member. In this a pair of wheels 1 are provided mounted on an axle 2 carried in brackets 3 secured to the under side of the side bars 4 of the main frame, said frame including end bars 5.

On the side bars 4 are standards or uprights 6 that rearwardly support inclined frame bars 7, the forward ends of which are bolted or similarly secured to the side bars 4 at the junction with the front end bar. On the standards 6 are bearing members 8 adapted for mounting free to turn therein the shaft 9 of the conveyer.

The conveyer is separately illustrated and is of the conventional type, including side boards 10 between which is mounted a canvas belt 11 with slats 12 at intervals, the canvas being mounted over a front roller 13 rotatable in the side boards 10, and a rear roller 14 on the shaft 9.

The conveyer includes brackets 15 adapted for attachment of a pickup for the grain. Such a pickup is illustrated, and is of a type in common use on grain combines, including side brackets 16 by which the pickup may be attached to the brackets 15 of the conveyer, a shaft 17 with drive pulley 18. On the front of the conveyer are guard teeth 19.

The forward end of the conveyer is supported on the main frame by a rod 20 that provides angled end portions 21 mounted to turn in brackets 22 on the side bars 4. The one end portion 21 of the rod 20 includes a crank arm 23 by which the rod may be turned, the crank arm being engaged by a lever 24 slidable on a ratchet 25 on the frame side bar.

The conveyer includes brackets, as at 26, on its under side for engagement with the rod 20.

For driving the conveyer and pickup we provide a stub shaft 27 on a lever arm 28 pivoted on the frame side bar at 29, and on which is a gear wheel 30 adapted to be brought into engagement with a gear wheel 31 on the axle 2. The shaft 27 carries a pulley 32 for driving connection by a belt 33 with a pulley 34 on the conveyer shaft 9. The pulley 34 further carries a belt 35 forming the driving connection with the pulley 18 of the pickup.

The swath turning member 36 is formed of a sheet metal body shaped to impart a turning movement to grain in passage delivered from the conveyor, and is supported on a frame extension 37 and brace bar 38 by a number of rods 39, and a rod 40 attaching to the upper side of the turning member. To effect this turning movement the body of the turning member provides a bottom portion extending rearwardly from the conveyer and forming a continuation thereof. The one side of the body is open for discharge of the material, and the other side is curved upward and over the bottom portion, this curved side starting from an intermediate point of the bottom portion and further inclining rearwardly towards the outlet side of the body.

The draft connection for the machine consists of a draft bar 41 that pivots on a forward arm 42 on the frame, and rearwardly is attachable by a bolt 43 vertically adjustable in a slide plate 44 on a frame side bar 4 by which the whole machine may be tilted.

There is further provided springs, as at 45, to partially carry the weight of the forward end of the conveyer and pickup to allow it to float over obstructions on the ground, the forward ends of the springs resting on the frame bars 4.

A hood 46 could be included in the machine as a protection from the wind.

In the use of the machine, grain taken up by the pickup mechanism is deposited on the conveyer to be carried back to the swath turning member 36 where the grain is reversed and slid out to the side on fresh stubble. The machine is driven from the axle 2 as shown and described, but may be linked up with any other source of power desired.

While we have herein disclosed a preferred embodiment of our invention it is obvious that changes in the construction and arrangement of parts would be permissible, and in so far as such changes come within the spirit and scope of the invention as defined in the appended claims they would be considered a part hereof.

Having thus particularly described and ascertained the nature of our invention, what we claim and wish to secure by Letters Patent is:

1. In a machine providing a pickup adapted to take up grain in the swath and a conveyer receiving grain from the pickup and elevating the grain for discharge, with means for driving the pickup and conveyer, a swath turning attachment comprising a sheet metal body mounted to receive grain from the conveyer, the bottom portion of said body extending rearwardly from the conveyer and having one side open for discharge of grain and the other side curved upward and over the bottom portion, the curved portion of said body inclining rearwardly towards the outlet side of the body.

2. In a machine providing a pickup adapted to take up grain in the swath and a conveyer receiving grain from the pickup and elevating the grain for discharge, with means for driving the pickup and conveyer, a swath turning attachment comprising a sheet metal body mounted to receive grain from the conveyer, the bottom portion of said body extending rearwardly from and forming a continuation of the conveyer with one side of said body open for discharge of grain, and the other side starting from an intermediate part of the bottom portion curving upward and over the bottom portion, the curved portion of said body inclining rearwardly inward towards the outlet side of said body.

ROBERT HAROLD SCHEMPP.
EDWARD HANS SCHEMPP.

REFERENCES CITED

The following references are of record in the file of this patent:

UNITED STATES PATENTS

| Number | Name | Date |
|---|---|---|
| 749,512 | Anderson | Jan. 12, 1904 |
| 1,790,447 | Siegenthaler | Jan. 27, 1931 |
| 2,233,837 | Fuhrof | Mar. 4, 1941 |